(No Model.)
G. P. HOBBS & A. L. EDWARDS.
WHEEL.
No. 518,736. Patented Apr. 24, 1894.
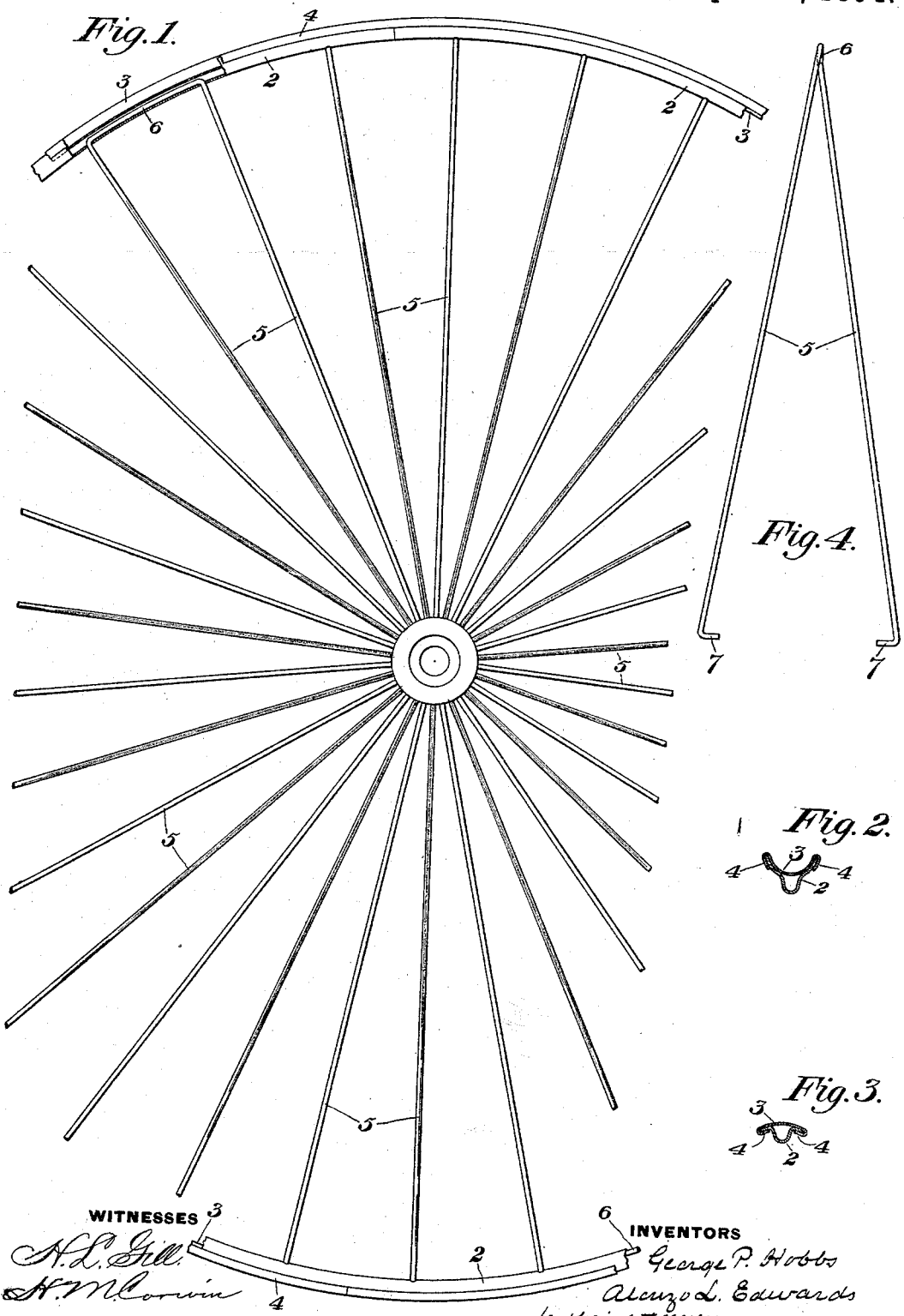

UNITED STATES PATENT OFFICE.

GEORGE P. HOBBS AND ALONZO L. EDWARDS, OF WHEELING, WEST VIRGINIA.

WHEEL.

SPECIFICATION forming part of Letters Patent No. 518,736, dated April 24, 1894.

Application filed August 30, 1893. Serial No. 484,371. (No model.)

*To all whom it may concern:*

Be it known that we, GEORGE P. HOBBS and ALONZO L. EDWARDS, of Wheeling, in the county of Ohio and State of West Virginia, have invented a new and useful Improvement in the Manufacture of Wheels, of which the following is a full, clear, and exact description, reference being had to the accompanying drawings, forming part of this specification, in which—

Figure 1 is a side elevation of our improved wheel partly broken away. Fig. 2 is an enlarged cross-sectional view of the rim. Fig. 3 is a similar cross-sectional view of a modified form of rim; and Fig. 4 is a detail view of the double spoke we employ.

Our invention relates to the manufacture of sheet-metal wheels, and is designed to cheapen, simplify, and improve their construction.

To that end it consists in a wheel having a double spoke, the intermediate portion of which extends longitudinally of the rim.

It also consists in a rim in two parts, having butt-joints at opposite sides of the wheel, these joints being soldered in the action of tinning, as well as in the shape of the tire, and the construction and arrangement of parts as hereinafter set forth and described in the claims.

In the drawings, in which similar numerals indicate corresponding parts, 2 represents the inner portion of the two-part rim, this portion being in the form of a trough, with flaring sides, and a recessed bottom to receive the intermediate portion of the spokes.

Figs. 1 and 2 show the rim employed with an elastic tire, the outer portion 3 having a central depression or channel to receive the tire, and flanges 4 to be bent over the sides of the lower portion. In Fig. 3 we show a modification employed when no elastic tire is used.

The spokes 5, as shown in Fig. 4, are made double, or with two spokes continuous and joined by the portion 5 which lies in the bottom recess of the rim, while the spokes extend to opposite ends of the hub and are secured by their projecting end 7.

As shown in the drawings, the joint of the inner rim portion is on the opposite side of the wheel from that of the outer rim joint, so that when these joints are soldered in the tinning bath a very strong and stiff construction results.

In making the wheel, a strip of sheet steel or other sheet metal is fed to stamping dies, which stamp the same into the desired cross section and at the same time curve it into circular form, the spoke holes are then punched in the bottom recessed portion and the double spokes slipped into place and their inner ends secured in the hub in any suitable manner. The outer portion of the rim having in the meantime been stamped into proper cross-section and circular form with its flanges flaring slightly, the wheel is hung upon a central pivot and the flanges of the outer rim portion are rolled and pressed over the sides of the part 2 by any suitable tool or machine, thus completing the body portion of the wheel, except for the tinning thereof. The wheel then being dipped in the tinning bath, all the joints are soldered, the spokes secured in place, and an exceedingly strong and light wheel thereby produced.

The advantages of the construction are apparent. The wheel weighs slightly over one-half as much as former wheels, while it is simpler and more easily put together. No heads or other devices are necessary to hold the spokes in the rim, as one spoke draws against and balances the next adjacent one. The peculiar shape of the rim is important as great strength and lightness is thereby obtained.

Many changes may be made in the form and arrangement of the parts without departure from our invention, since what we desire to claim and secure by Letters Patent is—

1. A double spoke having its connecting portion arranged to lie lengthwise of the rim, and its two inwardly projecting spoke portions arranged to terminate in and be secured in the hub; substantially as described.

2. A double spoke having an intermediate portion arranged to lie longitudinally of the rim, the spoke portions passing to opposite ends of the hub and terminating therein, substantially as described.

3. A double spoke composed of a single integral wire having an intermediate portion arranged to lie longitudinal of the rim, the two spoke portions extending to opposite ends of the hub and having bent ends arranged to be engaged therein, substantially as described.

4. A wheel having a hollow sheet metal rim composed of an outer and inner circular part, the abutting ends of the respective parts being fixed together, and the joints being located at opposite portions of the circumference of the wheel; substantially as described.

5. A wheel, having a rim composed of a sheet metal trough portion provided with a central bottom groove or depression and flaring sides, a sheet-metal cover portion having flanges bent about the sides of the trough portion, and a double spoke having an intermediate portion lying in the groove or depression; substantially as described.

6. A wheel having a rim provided with an outer longitudinal depression, and double spokes having their intermediate portions resting upon the rim in said depression; substantially as described.

7. The method of making a wheel, consisting in stamping a sheet-metal strip into trough form, at the same time curving it into circular form, punching holes therein, inserting the spokes and tying them in the hub, stamping a cover rim in the same manner as the trough, and rolling it on over the trough; substantially as described.

In testimony whereof we have hereunto set our hands.

GEORGE P. HOBBS.
ALONZO L. EDWARDS.

Witnesses:
HARVEY L. CARMACK,
R. S. AGNEW.